United States Patent
Lehtiniemi et al.

(10) Patent No.: US 10,402,984 B2
(45) Date of Patent: Sep. 3, 2019

(54) MONITORING

(71) Applicant: Nokia Technologies Oy, Espoo (FI)

(72) Inventors: Arto Lehtiniemi, Lempäälä (FI); Jussi Leppänen, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 15/750,598

(22) PCT Filed: Aug. 10, 2016

(86) PCT No.: PCT/FI2016/050560
§ 371 (c)(1),
(2) Date: Feb. 6, 2018

(87) PCT Pub. No.: WO2017/029434
PCT Pub. Date: Feb. 23, 2017

(65) Prior Publication Data
US 2019/0019295 A1 Jan. 17, 2019

(30) Foreign Application Priority Data

Aug. 14, 2015 (EP) .................................... 15181162

(51) Int. Cl.
*G06T 7/20* (2017.01)
*H04R 3/00* (2006.01)
(Continued)

(52) U.S. Cl.
CPC .................. *G06T 7/20* (2013.01); *G06T 7/11* (2017.01); *H04R 1/406* (2013.01); *H04R 3/005* (2013.01);
(Continued)

(58) Field of Classification Search
CPC .. G06T 7/20; G06T 7/11; H04R 1/406; H04R 3/005; H04R 5/027; H04R 5/04;
(Continued)

(56) References Cited

U.S. PATENT DOCUMENTS 7,613,310 B2 * 11/2009 Mao ..................... G10L 21/0208
367/119
7,803,050 B2 * 9/2010 Mao ........................ A63F 13/06
381/111
(Continued)

FOREIGN PATENT DOCUMENTS

EP 284492 A1 6/2015
EP 3037917 A1 6/2016
(Continued)

OTHER PUBLICATIONS

Office action received for corresponding Japanese Patent Application No. 2018-506907, dated Mar. 7, 2019, 4 pages of office action and 4 pages of office action translation available.
(Continued)

*Primary Examiner* — Manav Seth
(74) *Attorney, Agent, or Firm* — Nokia Technologies Oy

(57) ABSTRACT

A method comprising: processing received image data and/or received depth data to track an object moving in a monitored scene space; determining a bearing of the tracked moving object in the monitored scene space; and adaptively filtering outputs from a plurality of spatially diverse microphones in dependence upon the bearing of the tracked moving object in the monitored scene space to produce a combined audio signal.

20 Claims, 5 Drawing Sheets

Figure 5:
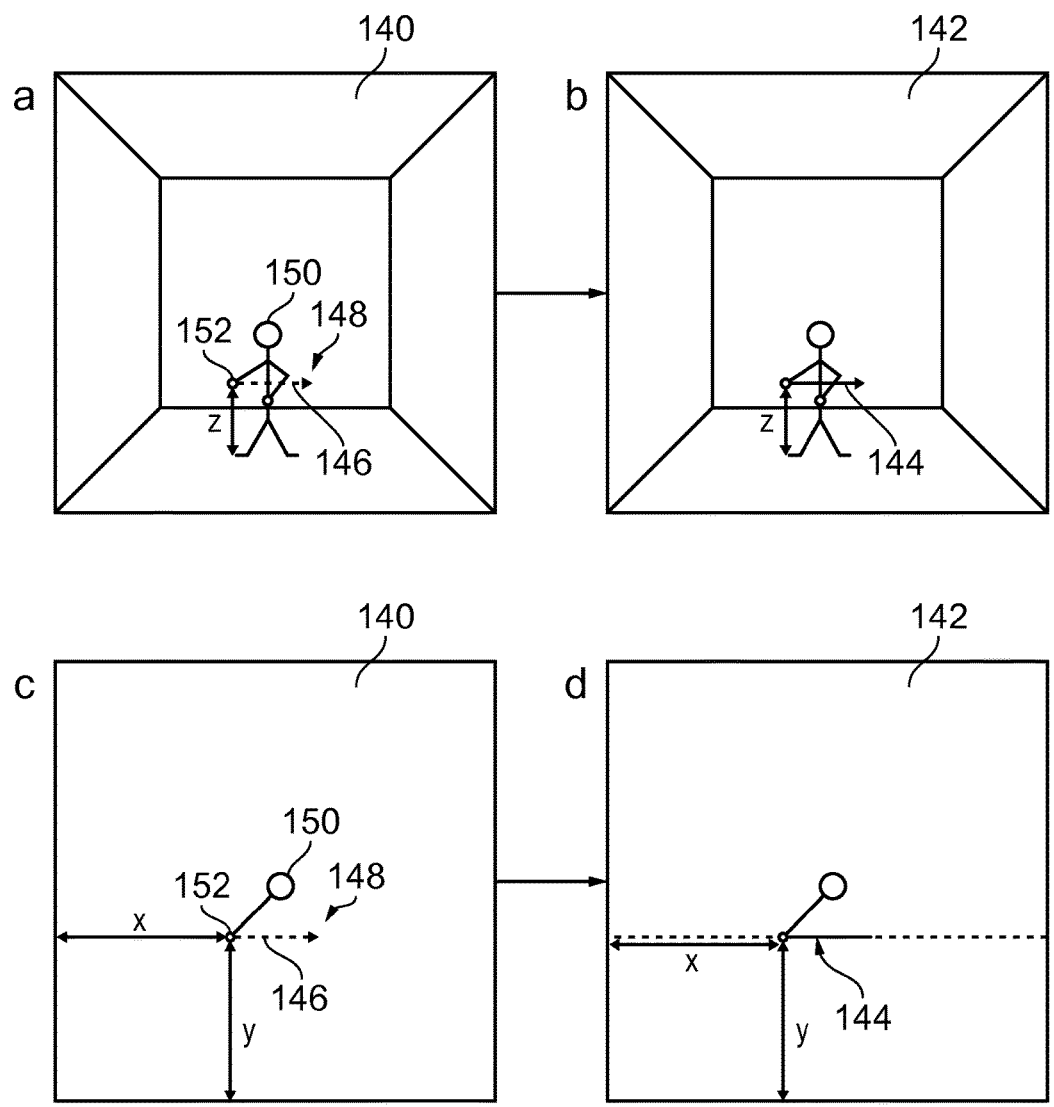

(51) Int. Cl.
*H04S 7/00* (2006.01)
*G06T 7/11* (2017.01)
*H04R 1/40* (2006.01)
*H04R 5/027* (2006.01)
*H04R 5/04* (2006.01)
*G10L 21/0216* (2013.01)

(52) U.S. Cl.
CPC ............... *H04R 5/027* (2013.01); *H04R 5/04* (2013.01); *H04S 7/303* (2013.01); *G10L 2021/02166* (2013.01); *H04R 2430/23* (2013.01); *H04R 2430/25* (2013.01); *H04S 2400/15* (2013.01)

(58) Field of Classification Search
CPC . H04R 2430/23; H04R 2430/25; H04S 7/303; H04S 2400/15; G10L 2021/02166
See application file for complete search history.

(56) References Cited

U.S. PATENT DOCUMENTS

| | | | | |
|---|---|---|---|---|
| 8,303,405 | B2* | 11/2012 | Zalewski | G06F 3/017 463/30 |
| 8,745,541 | B2* | 6/2014 | Wilson | G06F 3/017 715/863 |
| 8,761,412 | B2* | 6/2014 | Hernandez-Abrego | H04R 3/005 381/92 |
| 9,282,196 | B1* | 3/2016 | Norris | H04M 1/72572 |
| 9,282,399 | B2* | 3/2016 | Kim | H04R 1/326 |
| 9,596,437 | B2* | 3/2017 | Zad Issa | H04R 3/005 |
| 9,729,833 | B1* | 8/2017 | Kusens | G06F 16/51 |
| 9,892,611 | B1* | 2/2018 | Kusens | G08B 21/043 |
| 2007/0297682 | A1* | 12/2007 | Zhang | G06K 9/4614 382/224 |
| 2011/0178798 | A1* | 7/2011 | Flaks | G10L 21/0208 704/226 |
| 2012/0155703 | A1 | 6/2012 | Hernandez-Abrego et al. | |
| 2014/0056470 | A1* | 2/2014 | Khawand | G06T 7/70 382/103 |
| 2015/0054943 | A1 | 2/2015 | Zad Issa et al. | |
| 2016/0043699 | A1* | 2/2016 | Sawa | H04R 1/406 381/57 |
| 2019/0066823 | A1* | 2/2019 | Owen | G16H 10/60 |

FOREIGN PATENT DOCUMENTS

| | | |
|---|---|---|
| EP | 3101511 A1 | 12/2016 |
| EP | 3101629 A1 | 12/2016 |
| EP | 3115870 A1 | 1/2017 |
| EP | 3115926 A1 | 1/2017 |
| JP | H05227531 A | 9/1993 |
| JP | H1051889 A | 2/1998 |
| JP | 2009296232 A | 12/2009 |
| JP | 2013025789 A | 2/2013 |
| WO | 2014/162171 A1 | 10/2014 |

OTHER PUBLICATIONS

"Delay Sum Beamforming", The Lab Book Pages, Retrieved on Jan. 25, 2018, Webpage available at : http://www.labbookpages.co.uk/audio/beamforming/delaySum.html.

Extended European Search Report received for corresponding European Patent Application No. 15181162.7, dated Feb. 12, 2016, 8 pages.

International Search Report and Written Opinion received for corresponding Patent Cooperation Treaty Application No. PCT/FI2016/050560, dated Oct. 10, 2016, 12 pages.

* cited by examiner

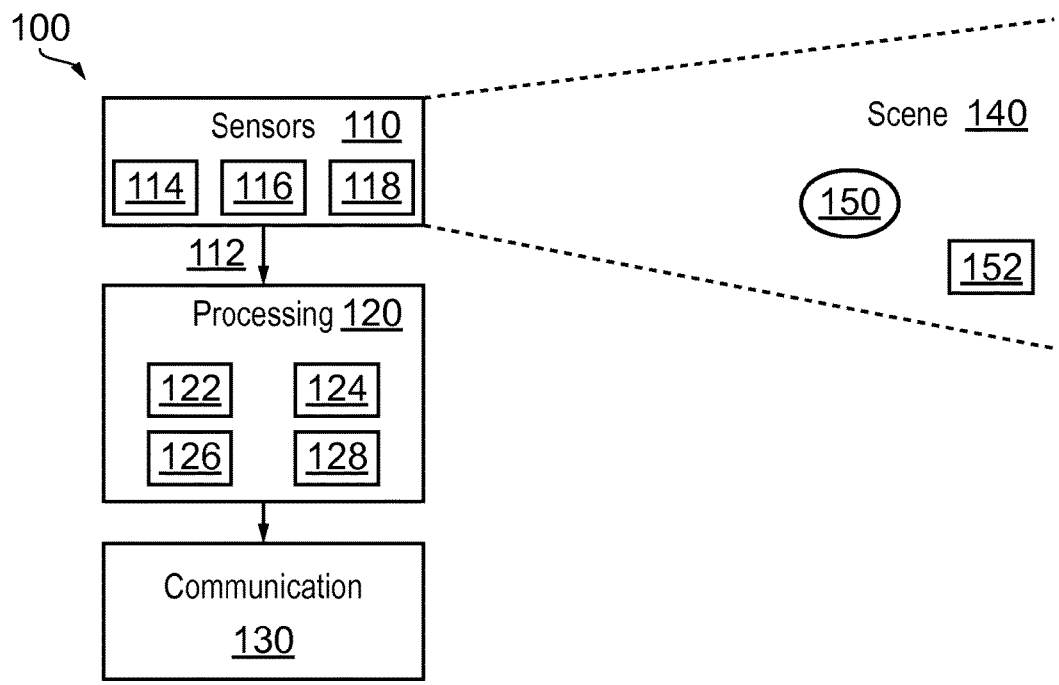
FIG. 1
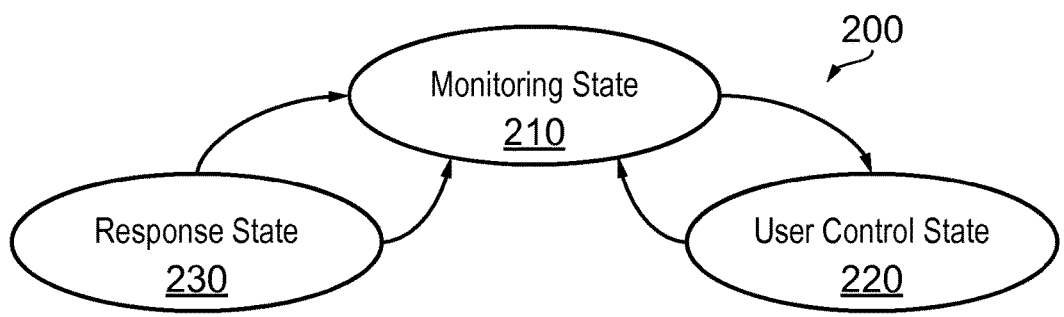
FIG. 2
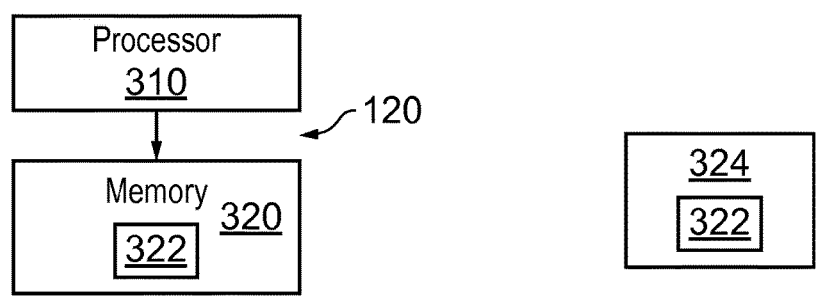
FIG. 3
FIG. 4

MONITORING

RELATED APPLICATION

This application was originally filed as Patent Cooperation Treaty Application No. PCT/FI2016/050560 filed Aug. 10, 2016 which claims priority benefit to European Patent Application No. 15181162.7, filed Aug. 14, 2015.

TECHNOLOGICAL FIELD

Embodiments of the present invention relate to monitoring a scene. In particular, they relate to automated monitoring of a scene.

BACKGROUND

Current monitoring systems may comprise one or more sensors connected via wires or wirelessly to a hub that stores or enables storage of the data recorded from the scene.

BRIEF SUMMARY

According to various, but not necessarily all, examples of the disclosure there is provided a method as claimed in any of claims 1-13.

According to various, but not necessarily all, examples of the disclosure there is provided an apparatus as claimed in claim 14.

According to various, but not necessarily all, examples of the disclosure there is provided an apparatus comprising: at least one processor; and
at least one memory including computer program code
the at least one memory and the computer program code configured to, with the at least one processor, cause the apparatus at least to perform a method as claimed in any of claims 1-13.

According to various, but not necessarily all, examples of the disclosure there is provided computer program code that, when performed by at least one processor, causes a method of at least one of claims 1-13 to be performed.

According to various, but not necessarily all, examples of the disclosure there is provided a computer program that, when run on a computer, performs: a method as claimed in any of claims 1-13.

According to various, but not necessarily all, embodiments of the invention there is provided examples as claimed in the appended claims.

BRIEF DESCRIPTION

Figure 6:
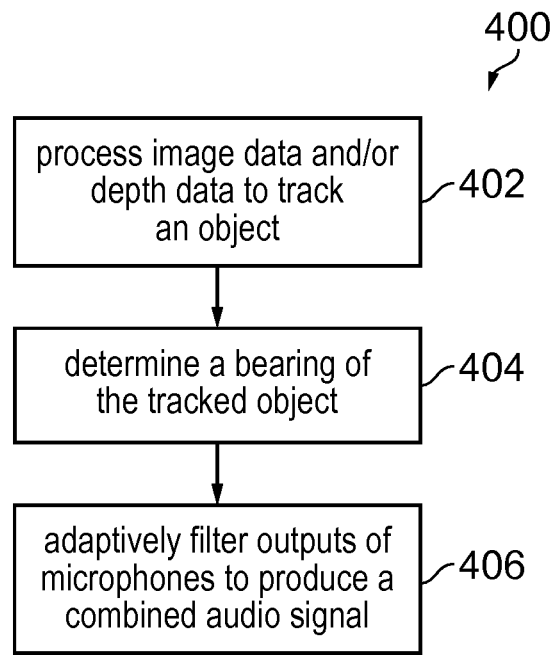
Figure 7:
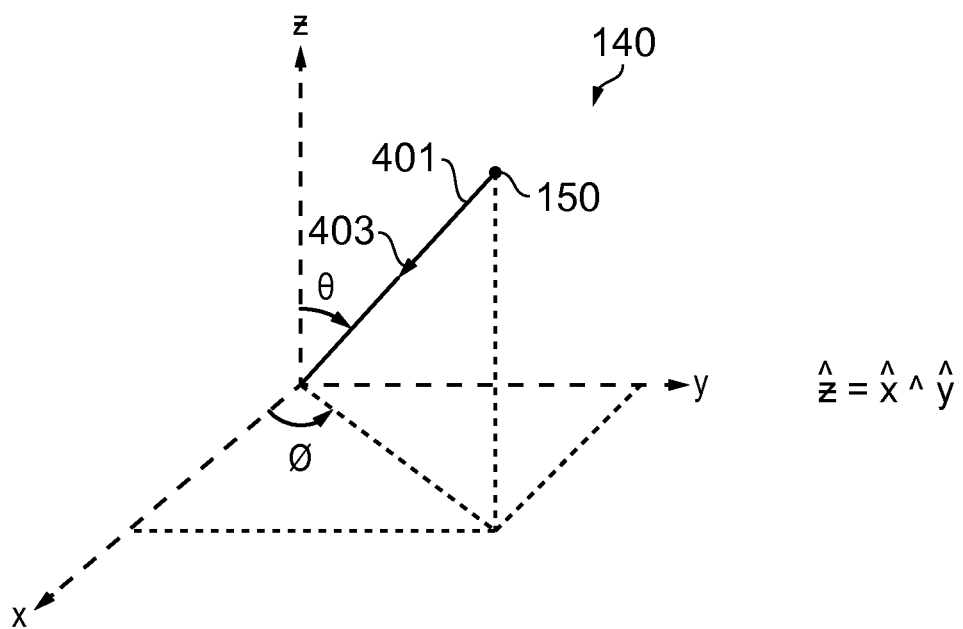
Figure 8:
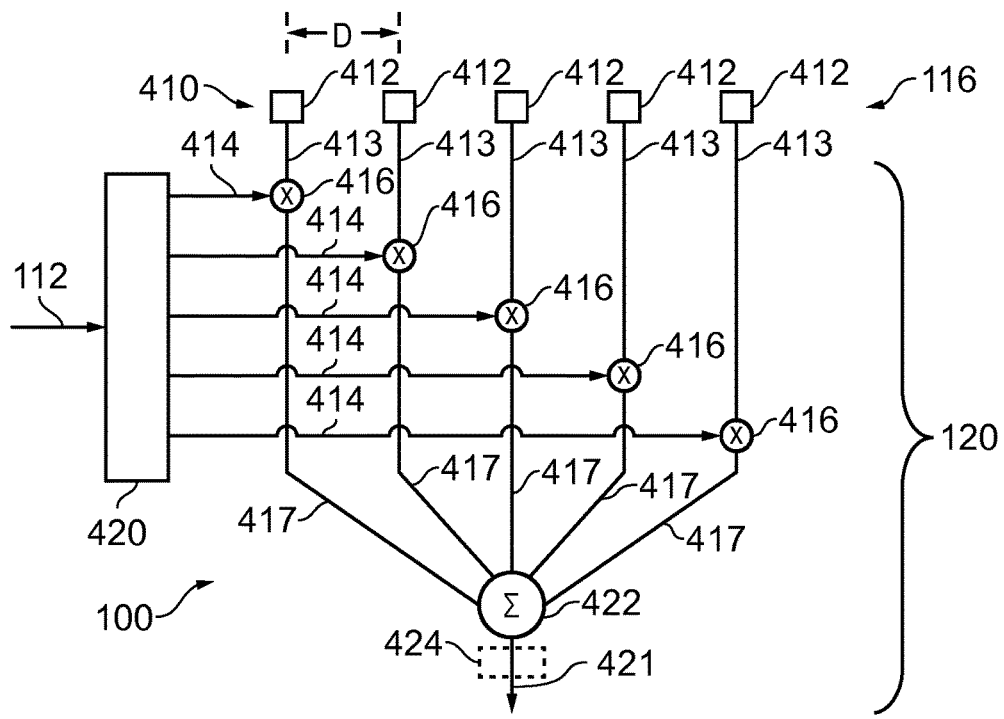

For a better understanding of various examples that are useful for understanding the brief description, reference will now be made by way of example only to the accompanying drawings in which:

FIG. 1 schematically illustrates an example of a system;
FIG. 2 illustrates an example of a state machine;
FIG. 3 illustrates an example of a processing module;
FIG. 4 illustrates an example of a delivery mechanism for a computer program;
FIG. 5 illustrates an example of operation of the system;
FIG. 6 illustrates an example of a method that may be performed by the system;
FIG. 7 illustrates an example of a bearing of a tracked object;
FIG. 8 illustrates an example of a system for adaptively filtering outputs from microphones in dependence upon a bearing of a tracked moving object;
FIGS. 9A-9E illustrate an example of using the system to adaptively filter outputs from microphones in dependence upon a bearing of a tracked moving object; and
FIGS. 10A-10B illustrate an example of using the system to adaptively filter outputs from microphones in dependence upon a bearing of a tracked moving object.

DETAILED DESCRIPTION

The system 100 described is a system that monitors at least one scene and adaptively filters outputs from a plurality of spatially diverse microphones in dependence upon a bearing of a tracked moving object in the scene to produce a combined audio signal.

FIG. 1 schematically illustrates a system 100 comprising: one or more sensors 110 configured to record sensor data 112 from a scene 140; a processing module 120 configured to process the sensor data 112 recorded from the scene 140 to recognise automatically events that occur in the scene 140 and to automatically take decisions as a consequence of the recognition; and a communication module 130 configured to communicate, when a decision to communicate is taken by the processing module 120.

Some but not necessarily all of the events that are recognised may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring or other applications. The system 100 may be used in businesses, public areas or at home.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording, Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space 140. In other examples, the sensors 110 are movable or moving relative to the scene space 140.

In some, but not necessarily all embodiments, the sensors 110 are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is visually sampled from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement such as a microphone array so that the scene 140 is audio sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the scene 140 with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person 150 may carry a positioning apparatus that is configured to position the positioning apparatus within the scene space 140. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data and/or processed sensor data 112 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114.

The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:
use machine (computer) vision to perform one or more of:
   detect a (moving or stationary) object or person,
   classify a (moving or stationary) object or person, and/or
   track a (moving or stationary) object or person;
use spatial analysis to perform one or more of:
   position a (moving or stationary) object in the scene space using depth determination; and/or
   create a map of the scene space; and/or
use behaviour analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behaviour.

Object tracking may be achieved by labelling objects and recording the position in the scene 140 of the labelled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The system may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behaviour analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognise a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124 as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognise meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 126 performs a response action.

In some but not necessarily all examples the action performed may be programmed by a user. In some but not necessarily all examples the programming may occur via motion of the user within the scene.

b) If the putative symbol is similar to a user control symbol, the meaningful event is a 'user control' event, and the control sub-module 126 enables user control of monitoring and/or user control of the response.

For example, a user may be able to program or teach a meaningful response symbol that is added to the database of reference symbols. In some but not necessarily all examples the programming may occur via motion of the user within the scene 140.

For example, a user may be able to program or teach an action performed when the putative symbol is matched to a response symbol.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 126 responds automatically depending on the event. If the meaningful event is a 'response' event, then the state machine 200 transitions to the response state 230 and the control sub-module 126 performs a response action. The response action may be associated with the response event. If the event is a 'user control' event, then the state machine 200 transitions to the user control state 220 and user control of monitoring and/or response is enabled. The enablement may be in a manner associated with that user control state 220.

A particular gesture user input may be used as a 'user control' event. A gesture user input is a gesture that has meaning to the system 100 as a user input.

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed with reference to FIGS. 1, 2, 5, 6, 7, 8, 9 and/or 10. The processor 310 by reading the memory 320 is able to load and execute the computer program 322.

The system 100 may therefore comprise an apparatus 120 that comprises:
at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1 and/or one or more of the blocks of FIGS. 6 and/or 8.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322 such as a modulated electromagnetic wave or digitally encoded electrical signal. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 and/or the blocks illustrated in FIGS. 6 and/or 8 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

FIG. 5 illustrates an example of operation of the system 100. Part a in the example of FIG. 5 illustrates a scene 140. The scene 140 is a real-world scene. The scene 140 comprises a three-dimensional space and may therefore be considered a scene space 140. The scene space 140 is monitored by the system 100. The scene space may therefore be considered a monitored scene space 140. In the example of FIG. 5 the monitored scene space 140 is a room comprising four walls, a ceiling and a floor.

In some examples the monitored scene space 140 may comprise no boundaries. Additionally or alternatively in examples the monitored scene space 140 may comprise a plurality of rooms that may or may not be spatially connected.

In the example of FIG. 5 a person 150 is standing in the monitored scene space 140. The person 150 is performing at least one gesture user input 146 to define at least one computer-implemented virtual boundary 144. The gesture user input 146 may be referred to as a gesture 146 and may be as described above with reference to FIG. 2. The gesture 146 may be considered a boundary indication gesture 146.

In the illustrated example the person 150 is performing a gesture 146 to define a single computer-implemented virtual boundary 144.

The gesture 146 comprises a motion along a path 148 at a location in the monitored scene space 140. In the example of FIG. 5 the gesture 146 comprises the person 150 moving an object 152 in his hand along a path 148. In the example the path 148 is a straight line across the monitored scene space 140.

In examples, the path 148 may comprise any motion in one spatial dimension, two spatial dimensions or three spatial dimensions and may take any form.

Part c of the example of FIG. 5 illustrates an overhead view of the monitored scene space 140 in which the person 150 is illustrated making the gesture 146 to define a computer-implemented virtual boundary 144.

As can be seen in parts a and c of the example of FIG. 5, the gesture 146 starts at a position having coordinates (x, y, z) in the scene 140 where x is measured from the left wall, y is measured from the front wall and z is measured from the floor. The gesture 146 ends at a finishing position having coordinates (x', y' and z') (not illustrated in FIG. 5).

In the example of FIG. 5 the gesture 146 comprises the person 150 moving the object 152 from the starting position (x, y, z) along a path 148 which is a straight line across the monitored scene space 140.

In the illustrated example the gesture 146 comprises motion in one spatial dimension as the value of x changes along the path 148 and the values of y and z remain constant.

In other examples the values of x, y and/or z may vary in any way along the path 148 from any starting position in the monitored scene space 140.

Parts b and d of the example of FIG. 5 illustrate a monitoring space 142. The monitoring space 142 comprises a virtual representation of the monitored scene space 140 created and used by the system 100. The monitoring space 142 may be formed, for example, from data received by the sensors 110, such as received image data and/or depth data.

Parts b and d illustrate respectively the same views as illustrated in parts a and c of FIG. 5.

In some examples the system 100 may use information of the geometry of the monitored scene space 140 to form the monitoring space 142. For example, the system 100 may use a three dimensional model of the monitored scene space 140 in the formation of the monitoring space 142. The three dimensional model of the monitored scene space 140 may be created by the system 100 and/or may be received by the system 100. Methods for creating a three dimensional model of the monitored scene space 140 are known in the art.

The system 100 may use the monitoring space 142 to monitor the scene space 140. For example, the system may use the monitoring space 142 to implement and monitor at least one virtual boundary 144.

As indicated by the arrows between parts a and b and parts c and d of FIG. 5 there is a correspondence between the monitoring space 142 and the monitored scene space 140. In some examples there may be a one to one mapping between the monitoring space 142 and the monitored scene space 140.

In other examples there may be a scale invariant transformation between the monitored scene space 140 and the monitoring space 142.

The system 100 recognizes the gesture 146 performed by the person 150 and in response implements at least one virtual boundary 144 in the monitoring space 142. In some examples, recognizing the gesture 146 may comprise processing received data, such as image data. For example, the system 100 may analyze one or more video feeds.

In examples, at least part of the virtual boundary 144 is determined by the path 148 in the monitored scene space 140 and the at least part of the virtual boundary 144 is located in the monitoring space at a corresponding location equivalent to the location of the path 148 in the monitored scene space 140.

For example, at least part of the virtual boundary 144 may be implemented along the path 148 at a location in the monitoring space 142 equivalent to the location of the path 148 in the monitored scene space 140.

The gesture 146 may be an absolute gesture or tethered gesture as described above in relation to FIG. 2.

As illustrated in parts b and d, in the example of FIG. 5, the virtual boundary 144 is implemented from a point (x, y, z) in the monitoring space 142 along the path 144. The point (x, y, z) in the monitoring space is equivalent to point (x, y, z) in the monitored scene space 140.

The system 100 may extend the virtual boundary 144 beyond the path 148. The system 100 may use information of the geometry of the monitored scene space 140, such as a three dimensional model, to extend the virtual boundary 144.

In some examples, the system 100 may extend the virtual boundary 144 to at least one boundary in the monitoring space 142 corresponding to at least one physical boundary in the monitored scene space 140. For example, the system 100 may extend the virtual boundary 144 from a first wall to a second wall and/or from a floor to a ceiling (see FIG. 6).

In the example of FIG. 5, the dotted line in part d of the Figure illustrates the extension of the virtual boundary 144 to the left and right boundaries of the monitoring space 142 corresponding to the left and right walls of the monitored scene space 140.

In some examples a user may indicate a path 148 comprising part of a virtual boundary enclosing an area and the system 100 may automatically complete the virtual boundary 144 enclosing the area. For example, a user may draw a path 148 that is and/or comprises a portion of a shape and the system 100 may complete the shape when implementing the virtual boundary 144.

As an example, a user may draw a path that is a semicircle and the system 100 may automatically extend the virtual boundary 144 to comprise the complete circle.

In some examples a user may indicate to the system 100 that the virtual boundary 144 should be extended to complete a boundary enclosing an area using a gesture 146 and/or one or more other inputs.

In some examples the system 100 may infer from a drawn path 148 that a virtual boundary 144 should be extended to enclose an area and may extend the virtual boundary 144 automatically.

The system 100 may provide feedback to a user to confirm that the system 100 has recognized the gesture 146 and has implemented the virtual boundary 144. The feedback may comprise any suitable feedback, for example audio and/or visual and/or tactile feedback and so on. Additionally or alternatively the system 100 may send one or more messages to a device or devices to inform the user that the system 100 has implemented the virtual boundary 144.

The system 100, may process received data to generate a response event when there is, relative to the at least one virtual boundary 144, a change in a portion of the monitored scene space 140. For example, the system 100 may process data received by the sensors 110, such as audio and/or image data, to generate the response event.

The system may analyze one or more audio and/or video feeds to generate the response event. In some examples processing the received data to generate the response event may be considered monitoring the virtual boundary 144.

In examples the same sensor, such as a camera, may be used in recognition of the gesture 146 defining the at least one virtual boundary 144 and for monitoring the at least one virtual boundary 144.

In some examples, processing received data to generate the response event may comprise processing received data to monitor the virtual boundary 144 to detect activity across the virtual boundary 144 and/or activity within a threshold of the virtual boundary 144. For example, the system 100 may process audio and/or image and/or depth data to monitor the virtual boundary 144 to detect activity across the virtual boundary 144 or within a threshold of the virtual boundary 144.

The system 100 may allow a user to verify that the one or more virtual boundaries 144 have been implemented without generating a response event. For example, the a user may define a virtual boundary 144 using a gesture 146 at a location in the monitored scene space 140 and may then interact with the location in the monitored scene space 140 to verify that the virtual boundary 144 is "in place". In examples the user may move at least a part of his body, such as his hand, through the location in the monitored scene space and the system 100 may provide feedback to confirm that the user has touched and/or crossed the virtual boundary 144. Any suitable feedback may be provided, for example, audio and/or visual and/or tactile feedback. Additionally or alternatively the system 100 may send at least one message to a device or devices of the user.

In examples the system 100 may begin to process received data to generate the response event after the user has verified the virtual boundary 144. For example, the system 100 will not generate an alert and/or increment a counter until after the user has verified the virtual boundary 144.

The response event may cause or change spatial audio processing, for example. The response event may, for example, change adaptive filtering of outputs from a plurality of spatially diverse microphones to change a combined audio signal that is produced. This change may be, for example, to effect directional gain or not to effect directional gain. This change may cause directional gain to enhance audio produced by a tracked object or produced by an object other than the tracked object.

A user of the system 100, such as person 150, may configure the response event. For example, a user may perform one or more additional gestures 146 that are recognized by the system 100 to configure the response event. In addition or alternatively the user may provide input to the system 100 to configure the response event using a device such as a tablet or mobile phone.

The system 100, in some examples, may process received data to generate a response event when there is, relative to the virtual boundary 144, a change in a portion of the monitored scene space 140 in relation to any object 152. For example, the system may generate a response event when any object 152 crosses, touches and/or comes within a threshold of the virtual boundary 144. Such virtual boundaries 144 may be considered general virtual boundaries 144.

In other examples, the system may process received data to generate a response event when there is, relative to the virtual boundary 144, a change in a portion of the monitored scene space 140 in relation to one or more user specified objects 152.

For example, after performing the gesture 146 to define at least one virtual boundary 144, a user 150 of the system 100 may perform a gesture 146 to indicate to the system 100 one or more objects 152. For example, the user 150 may point to the one or more objects 152 using his hand or a mobile device and/or may position the object or objects in a viewfinder of a device.

In other examples, the gesture 146 indicating the one or more objects may be performed before the gesture 146 defining the virtual boundary 144.

The system 100 may recognize the gesture 146 indicating the one or more objects 152 and in response the system 100 may generate a response event only when there is a change in a portion of the monitored scene space 140, relative to the virtual boundary 144, in relation to the indicated objects 152. For example, the system 100 may generate a response event only when one of the indicated objects 152 crosses, touches and/or comes within a threshold of the virtual boundary 144. Such virtual boundaries 144 may be considered object specific virtual boundaries.

With reference to the example of FIG. 5, the person 150 may perform the gesture 146 to define the virtual boundary 144 and the system 100 may recognize the gesture 144 and implement the virtual boundary 144.

The person 150 may then perform a further gesture, such as pointing to himself or another person or object. The system recognizes the further gesture and monitors the virtual boundary 144 only in relation to the pointed to object. For example, the system 100 may generate a response event when that object crosses, touches and/or comes within a threshold of the virtual boundary 144 but not when any other object 150 crosses, touches and/or comes within threshold of the virtual boundary 144.

In some examples a virtual boundary 144 may be conditionally monitored and/or conditionally enabled/disabled. For example, the system 100 may process received data to generate a response event when there is, relative to the virtual boundary 144, a change in a portion of the monitored scene space 140 when one or more criteria are satisfied but does not process received data to generate the response event otherwise.

The criteria may be predefined and/or may be configured by a user using a gesture and/or one or more additional inputs.

In examples any criterion/criteria may be used. For example, any temporal and/or physical criteria may be used. In examples, a virtual boundary 144 may be conditionally monitored dependent upon time of day and/or day of week and/or week of month and/or month of year and/or independence upon the presence of one or more objects 152 in the monitored scene space 140.

FIG. 6 illustrates an example of a method 400 performed by the system 100 to produce a combined audio signal 421.

At block 402, the system 100 processes received image data and/or received depth data to track an object moving in a monitored scene space.

At block 404, the system 100 determines a bearing of the tracked moving object in the monitored scene space.

At block 406, the system 100 adaptively filters outputs from a plurality of spatially diverse microphones in dependence upon the bearing of the tracked moving object in the monitored scene space to produce a combined audio signal.

The blocks 400, 402, 404 may occur in real-time to produce in real-time the combined audio output signal.

FIG. 7 illustrates a tracked moving object 150 in the monitored scene space 140. A coordinate system is also illustrated. In this example, a spherical coordinate system is used to define a bearing 401 of the tracked moving object 150 in the monitored scene space from an origin O. The origin O is located at the plurality of spatially diverse microphones. The bearing 401 in spherical coordinates is (θ', φ'), where θ' is a value of θ, a polar angle, between 0 and 180 degrees and φ' is a value of φ, an azimuthal angle, between 0 and 360 degrees.

The system 100 may be configured to adaptively filter outputs from the plurality of spatially diverse microphones in dependence upon the bearing 401 of the tracked moving object 150 in the monitored scene space 140 to produce a combined audio signal that has, for example, directional gain 403 enhancing audio produced by the tracked object 150. The combined audio output signal may, for example, have directional gain 403 in a target direction (θ", φ") where θ" is a value of θ, the polar angle, between 0 and 180 degrees and φ" is a value of φ, the azimuthal angle, between 0 and 360 degrees.

The target direction (θ", φ") is determined by the bearing (θ', φ') of the tracked moving object 150. The target direction (θ", φ") and the bearing (θ', φ') may be aligned (the same), as illustrated in the example of FIG. 7 where the target direction (θ", φ") is also a bearing (θ', φ') of the tracked moving object 150, or the target direction (θ", φ") and the bearing (θ', φ') may not be aligned (different).

FIG. 8 illustrates an example of the system 100.

In this example, the processing module 120 is configured to process received image data 112 and/or received depth data 112 to track an object 150 moving in a monitored scene space 140. The processing module 120 is configured to determine a bearing 401 of the tracked moving object 150 in the monitored scene space 140. The processing module 120 is configured adaptively filter 416 outputs 413 from a plurality of spatially diverse microphones 412 in dependence upon the bearing 401 of the tracked moving object 150 in the monitored scene space 140 to produce a combined audio signal 421. The combined audio output signal 421 may be produced in real-time. The system 100 is therefore multiple input 413, single output 421 (MISO).

In the example of FIG. 8, a beamformer module 420 is configured to create independent filter coefficients ($f_i$) 414 for each of the outputs ($x_i$) 413 from the plurality of spatially diverse microphones 412. Each filter 416 filters the output ($x_i$) 413 from a particular microphone 412 to produce a filtered output 417 for each microphone 412. For example, each filter 416 may be a finite impulse response (FIR) filter, defined by coefficients $f_i$ 414, that filters the output ($x_i$) 413 from a particular microphone 412 to produce a filtered output 417 for each microphone 412 The filtered outputs 417 of the plurality of spatially diverse microphones 412 are summed to produce the combined audio output signal S 421.

The beamformer module 420 may control the directional gain of the combined audio output signal S 421. For example, particular filter coefficients ($f_i$) 414 may be used for each of the outputs ($x_i$) 413 from the microphones 412 to achieve a desired gain. For example, filter coefficients ($f_i$) 414 may be selected to produce omni-directional gain or different filter coefficients ($f_i$) 414 may be selected to produce gain in a target direction.

For example, the filter coefficients ($f_i$) 414 may be created in dependence upon the bearing 401 of the tracked moving object 150 in the monitored scene space 140 to produce a combined audio output signal (S) 421 that has directional gain 403 in a target direction.

The above described beamformer module 420 is a filter-sum beamformer module. In some examples, the filter-sum beamformer module may be a delay-sum beamformer module. A delay-sum beamformer uses filter coefficients ($f_i$) 414 to add a particular delay to each of the outputs ($x_i$) 413 from the plurality of spatially diverse microphones 412 in the time domain.

If the plurality of spatially diverse microphones 412 (labeled i, where i=1, 2 . . . N) are aligned along the unit vector d with regular separation D, then the scalar separation between an origin at the first i=1 microphone 412 and the ith microphone is D*i and the vector separation $S_i$ between the first i=1 microphone 412 and the ith microphone is D*i*d. If the directional gain 403 is in a target direction having unit vector t, then the path length difference $L_i$ at the ith filter compared to the origin (i=1) is the component of vector separation $S_i$ aligned along the target direction unit vector t which is given by the vector dot (scalar) product of the vector separation $S_i$ and the target direction unit vector t ($L_i=S_i·t=D*i*d·t$, where '·' is the vector dot (scalar) product). The phase difference $\varphi_i$ introduced by the path length difference $L_i$ at the ith filter compared to the origin (i=1) is the path length difference $L_i$ divided by the wavelength λ and multiplied by 2π radians ($\varphi_i=L_i*2\pi/\lambda=S_i·t*2\pi/\lambda=D*i*d·t*2\pi/\lambda$. The filter $f_i$ may be exp($j*\varphi_i$). Therefore the phase delay introduced by the ith filter to the corresponding output 413 from the corresponding microphone 412 is proportional to (D*i*d)·t, where '·' is the vector dot (scalar) product. The filter $f_i$ is exp($j*D*i*d·t*2\pi/\lambda$), where λ is the wavelength of the sound. The target direction t of the directional gain 403 is dependent upon the bearing 401 of the tracked moving object 150.

Generalizing to an arbitrary origin, if each of the plurality of spatially diverse microphones 412 is instead at a distance $D_i$ along a unit vector $d_i$, and the directional gain 403 is in a target direction having unit vector t, then the phase difference (relative to the arbitrary origin) introduced by each filter i to the corresponding output 413 from the corresponding microphone 412 is $D_i*d_i·t*2\pi/\lambda$, where '·' is the vector dot (scalar) product. The phase difference (relative to an origin at the first i=1 microphone 412) introduced by each filter i to the corresponding output 413 from the corresponding microphone 412 is $[D_i*d_i·t-D_1*d_1·t]*2\pi/\lambda$, where '·' is the vector dot (scalar) product. The filter $f_i$ is exp($j*(D_i*d_i·t-D_1*d_1·t)*2\pi/\lambda$), where λ is the wavelength of the sound. The target direction t of the directional gain 403 is dependent upon the bearing 401 of the tracked moving object 150.

In some but not necessarily all examples, the system 100 may additionally comprise a post-filter 424 for filtering the combined audio output signal (S) 421 that has directional gain 403 in a target direction. The post-filter 424 may, for example, be an adaptive post filter that reduces noise.

The plurality of spatially diverse microphones 412 may be configured, for example, as a fixed array in one, two or three dimensions. The plurality of spatially diverse microphones 412 may be in some but not necessarily all examples internal microphones of a device that are permanently integrated as hardware of the device as opposed to externally attached or interconnected as peripherals.

FIGS. 9A to 9E illustrate some examples of how the system 100, in use, adaptively filters outputs 413 from a plurality of spatially diverse microphones 412 in dependence upon the bearing 401 of the tracked moving object 150 in the monitored scene space 140 to produce a combined audio signal 421.

In these examples, the system 100 adaptively filters 416 outputs 413 from a plurality of spatially diverse microphones 412 in dependence upon the bearing 401 of the tracked moving object 150 in the monitored scene space 140 relative to computer-implemented virtual boundaries 144 in a monitoring scene space 142 that corresponds to the monitored scene space 140 as previously described.

In these illustrated examples, different portions of the monitored scene space are demarcated by different computer-implemented virtual boundaries 144 in the monitoring scene space 142 corresponding to the monitored scene space 140. It should be understood that the number, shape and other attributes of the boundaries are merely illustrative and that any one or more portions of the monitored scene space may be demarcated in any suitable way by one or more different computer-implemented virtual boundaries 144 in the monitoring scene space 142.

A first portion A of the monitored scene space is demarcated by a first computer-implemented virtual boundary or boundaries 144 in the monitoring scene space 142 corresponding to the monitored scene space 140.

A second portion B of the monitored scene space is demarcated by a second computer-implemented virtual boundary or boundaries 144 in the monitoring scene space 142 corresponding to the monitored scene space 140.

A third portion C of the monitored scene space is demarcated by a third computer-implemented virtual boundary or boundaries 144 in the monitoring scene space 142 corresponding to the monitored scene space 140.

A fourth portion D of the monitored scene space is demarcated by a fourth computer-implemented virtual boundary or boundaries 144 in the monitoring scene space 142 corresponding to the monitored scene space 140.

In this example, the fourth portion D shares boundaries 144 with each of the first portion A, the second portion B and the third portion C. That is the first portion A, the second portion B and the third portion C form isolated islands separated by the fourth portion D.

The system 100 detects movement of the tracked object 150 and can determine whether the tracked object 150 is in the first, second, third or fourth portion and where it is located that portion.

Figure 9A:
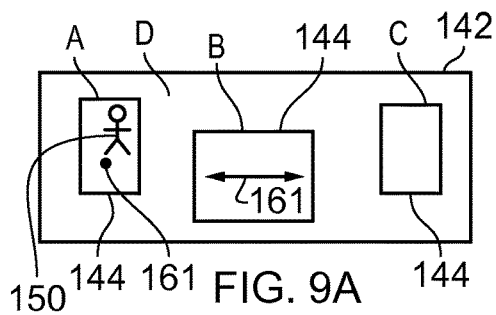
Figure 10A:
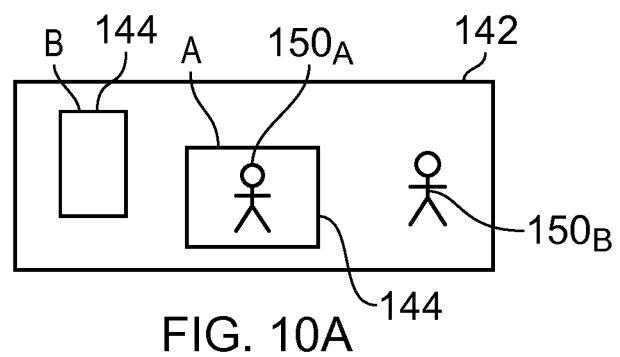
Figure 10B:
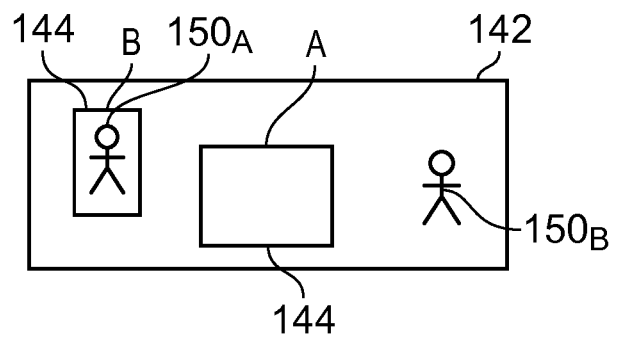

As illustrated in FIG. 9A, when the tracked object 150 is in the first portion A, the system 100 adaptively filters 416 outputs 413 from a plurality of spatially diverse microphones 412 in dependence upon the bearing 401 of the tracked moving object 150 in the monitored scene space to produce a combined audio signal 421. The combined audio signal (S) 421 has directional gain 403 in a target direction determined by the bearing ($\theta'$, $\varphi'$) of the tracked moving object 150. The target direction ($\theta''$, $\varphi''$) and the bearing ($\theta'$, $\varphi'$) are not aligned. The target direction ($\theta''$, $\varphi''$) is not the bearing ($\theta'$, $\varphi'$) of the tracked moving object 150 but is a predetermined fixed bearing 161 within the first portion A. The target direction ($\theta''$, $\varphi''$) does not change while the tracked moving object 150 moves within the first portion A.

Figure 9B:
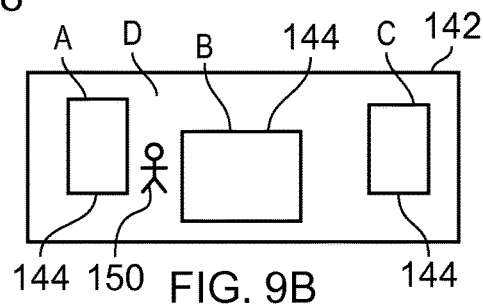
Figure 9C:
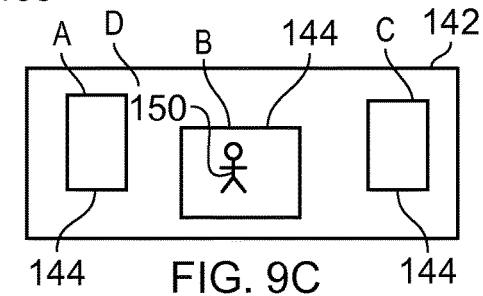
Figure 9D:
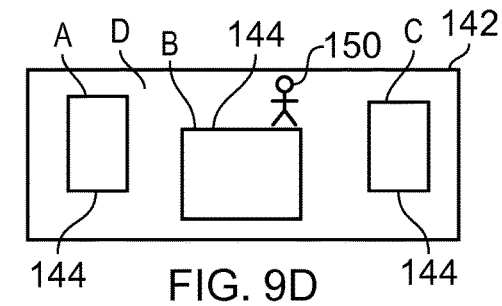

As illustrated in FIGS. 9B and 9D, when the tracked object 150 is in the fourth portion D, the system 100 adaptively filters 416 outputs 413 from a plurality of spatially diverse microphones 412 in dependence upon the bearing 401 of the tracked moving object 150 in the monitored scene space to produce a combined audio signal 421. The combined audio signal S 421 has, for example, omni-directional gain 403.

As illustrated in FIG. 9C, when the tracked object 150 is in the second portion B, the system 100 adaptively filters 416 outputs 413 from a plurality of spatially diverse microphones 412 in dependence upon the bearing 401 of the tracked moving object 150 in the monitored scene space to produce a combined audio signal 421. The combined audio signal (S) 421 has directional gain 403 in a target direction determined by the bearing ($\theta'$, $\varphi'$) of the tracked moving object 150. The target direction ($\theta''$, $\varphi''$) and the bearing ($\theta'$, $\varphi'$) are aligned (the same). The target direction ($\theta''$, $\varphi''$) is also a bearing ($\theta'$, $\varphi'$) of the tracked moving object 150 and changes 161 as the tracked moving object 150 moves within the second portion B.

Figure 9E:
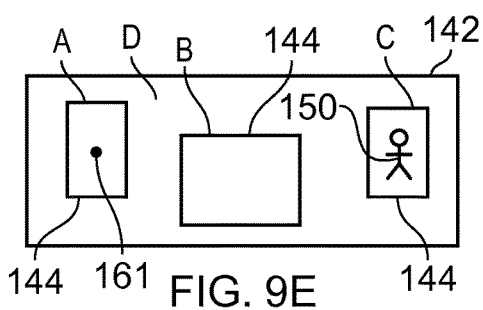

As illustrated in FIG. 9E, when the tracked object 150 is in the third portion C, the system 100 adaptively filters 416 outputs 413 from a plurality of spatially diverse microphones 412 in dependence upon the bearing 401 of the tracked moving object 150 in the monitored scene space to produce a combined audio signal 421. The combined audio signal (S) 421 has directional gain 403 in a target direction determined by the bearing ($\theta'$, $\varphi'$) of the tracked moving object 150. The target direction ($\theta''$, $\varphi''$) and the bearing ($\theta'$, $\varphi'$) are not aligned. The target direction ($\theta''$, $\varphi''$) is not the bearing ($\theta\zeta$, $\varphi'$) of the tracked moving object 150 but is, for example, a predetermined fixed bearing 161 outside the third portion C or is a bearing of a different tracked moving object. The target direction ($\theta''$, $\varphi''$) in this example does not change while the tracked moving object 150 moves within the third portion C.

The movement between the portions A, B, C, D across the virtual computer implemented boundaries 144 can be detected as previously described and the adaptive filtering described above for each portion may be a response event as previously described. The adaptive filtering consequentially changes in dependence upon detecting movement of the tracked object 150 from one portion of the monitored scene space to another portion of the monitored scene space across at least one computer-implemented virtual boundary 144.

As previously described the computer-implemented virtual boundaries may be predefined by a user creating portions A, B, C, D.

A user may also define for each portion how the filtering 416 of outputs 413 from the plurality of spatially diverse microphones 412 depends upon the bearing 401 of the tracked moving object 150 in the monitored scene space.

For example, a user may define whether or not, the combined audio signal (S) 421 has directional gain 403 or omni-directional gain.

For example, a user may define how the directional gain 403 in a target direction is determined by the bearing ($\theta'$, $\varphi'$) of the tracked moving object 150.

For example, the user may define whether or not the target direction ($\theta''$, $\varphi''$) and the bearing ($\theta'$, $\varphi'$) are aligned.

For example, a user may define, when the target direction ($\theta''$, $\varphi''$) and the bearing ($\theta'$, $\varphi'$) are not aligned, characteristics of the target direction ($\theta''$, $\varphi''$) such as whether it is fixed or variable and its value.

In the example illustrated in FIGS. 9A and 9C the adaptive filtering 416 of outputs 413 from the plurality of spatially diverse microphones 412 has directional gain configured to enhance audio produced by the tracked object 150.

In the example illustrated in FIG. 9D the adaptive filtering 416 of outputs 413 from the plurality of spatially diverse microphones 412 has directional gain configured to enhance audio produced other than by the tracked object 150.

From the foregoing it will be appreciated that the processing module 120 may process received data 112 to generate a response event when there is, relative to the at least one virtual boundary 144, a change in a portion of the monitored scene space 142; and in response to the response event, change the adaptive filtering 416 of outputs 413 from the plurality of spatially diverse microphones 412 to produce a combined audio output signal 421. The processing of received data 112 to generate a response event comprises processing received image data and/or received depth data to track the object 150 moving in a monitored scene space and monitor the tracked object in relation to the at least one virtual boundary to detect movement across the at least one virtual boundary and/or movement within a threshold of the at least one virtual boundary. Processing the received data to generate a response event may be conditional, for example, only performed if at least one condition is satisfied and not performed if the at least one condition is not satisfied.

FIGS. 10A and 10B illustrate some examples of how the system 100, in use, adaptively filters 416 outputs 413 from a plurality of spatially diverse microphones 412 in dependence upon the bearings of tracked moving objects 150A, 150B in the monitored scene space 140 to produce a combined audio signal 421.

In these examples, the system 100 adaptively filters 416 outputs 413 from a plurality of spatially diverse microphones 412 in dependence upon the bearing of the tracked moving object 150A or the bearing of the tracked moving object 150B relative to computer-implemented virtual boundaries 144 in the monitoring scene space 142.

A first portion A of the monitored scene space is demarcated by a first computer-implemented virtual boundary or boundaries 144 in the monitoring scene space 142 corresponding to the monitored scene space 140. A second portion B of the monitored scene space is demarcated by a second computer-implemented virtual boundary or boundaries 144 in the monitoring scene space 142 corresponding to the monitored scene space 140.

The system 100 simultaneously tracks more than one object. The system 100 simultaneously tracks object 150A and object 150B.

When the object 150A is in the first portion A, the adaptive filtering 416 of outputs 413 from the plurality of spatially diverse microphones 412 has directional gain configured to enhance audio produced by the tracked object 150A not by the tracked object 150B.

When the object 150A is in the second portion B, the adaptive filtering 416 of outputs 413 from the plurality of spatially diverse microphones 412 has directional gain configured to enhance audio produced by the tracked object 150B not by the tracked object 150A.

It will be appreciated that different conditions when satisfied can cause changes in the adaptive filtering 416 of outputs 413 from the plurality of spatially diverse microphones 412. For example satisfaction of such a condition may be based on a bearing of only the tracked object 150A, based on a bearing of only the tracked object 150B or based on bearings of the tracked object 150A and the tracked object 150B. The condition may change based on a bearing of only the tracked object 150A, based on a bearing of only the tracked object 150B or based on bearings of the tracked object 150A and the tracked object 150B.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    processing received image data and/or received depth data to track an object moving in a monitored scene space;
    determining a bearing of the moving object in the monitored scene space;
    filtering outputs from a plurality of spatially diverse microphones in dependence upon the bearing of the moving object in the monitored scene space to produce a combined audio output signal, wherein the combined audio output signal has directional gain in a target direction;
    defining at least a first portion of the monitored scene space and a second portion of the monitored scene space separated by at least one virtual boundary;
    detecting movement of the moving object from the first portion of the monitored scene space to the second portion of the monitored scene space across the at least one virtual boundary; and
    in dependence upon detecting movement of the moving object from the first portion of the monitored scene space to the second portion of the monitored scene space across the at least one virtual boundary, changing the target direction from a first direction being one of one or more target directions associated with the first portion of the monitored scene space to a second direction being one of the one or more target directions associated with the second portion of the monitored scene space, wherein the second direction is different from the first direction.

2. A method as claimed in claim 1, wherein the combined audio output signal has directional gain enhancing audio produced by the moving object.

3. A method as claimed in claim 1, wherein the target direction is determined by the bearing of the moving object and/or wherein the target direction is a bearing of the moving object.

4. A method as claimed in claim 1 comprising:
defining a plurality of portions of the monitored scene space demarcated by virtual boundaries;
detecting movement of the moving object from an originating portion of the monitored scene space to a destination portion of the monitored scene space across one or more virtual boundaries; and
in dependence upon detecting movement of the moving object from an originating portion of the monitored scene space to a destination portion of the monitored scene space across one or more virtual boundaries, changing the target direction to point towards a predetermined bearing within the originating portion of the monitored scene space to a predetermined bearing within the destination portion of the monitored scene space.

5. A method as claimed in claim 1 further comprising providing for user predefinition of one or more virtual boundaries and/or user predefinition of one or more target directions.

6. A method as claimed in claim 1, wherein filtering outputs from a plurality of spatially diverse microphones in dependence upon the bearing of the moving object in the monitored scene space to produce a combined audio output signal comprises using a filter-sum beamformer or delay-sum beamformer configured in dependence upon the bearing of the moving object in the monitored scene space.

7. A method as claimed in claim 1 comprising determining whether the filtering of outputs from the plurality of spatially diverse microphones has directional gain configured to enhance audio produced by the moving object or directional gain configured to enhance audio produced other than by the moving object
and/or
determining whether the filtering of outputs from the plurality of spatially diverse microphones has directional gain configured to enhance audio produced by the moving object or directional gain configured to enhance audio produced by a different object.

8. A method as claimed in claim 1, wherein the processing of the received image data and/or the received depth data to track an object moving in a monitored scene space; the determining a bearing of the moving object in the monitored scene space; and the filtering of outputs from the plurality of spatially diverse microphones in dependence upon the bearing of the moving object in the monitored scene space, occur in real-time to produce in real-time the combined audio output signal.

9. A method as claimed in claim 1, wherein the plurality of spatially diverse microphones form a uniformly spaced array and/or form a fixed array and/or are internal microphones of a device.

10. A method as claimed in claim 1, comprising:
processing received data to generate a response event when there is, relative to at least one virtual boundary, a change in a portion of the monitored scene space; and
in response to the response event, changing the filtering of outputs from the plurality of spatially diverse microphones to produce a combined audio output signal.

11. An apparatus comprising at least one processor and at least one memory, the memory comprising machine-readable instructions, that when executed cause the apparatus to:
process received image data and/or received depth data to track an object moving in a monitored scene space;
determine a bearing of the moving object in the monitored scene space;
filter outputs from a plurality of spatially diverse microphones in dependence upon the bearing of the moving object in the monitored scene space to produce a combined audio output signal, wherein the combined audio output signal has directional gain in a target direction;
define at least a first portion of the monitored scene space and a second portion of the monitored scene space separated by at least one virtual boundary;
detect movement of the moving object from the first portion of the monitored scene space to the second portion of the monitored scene space across the at least one virtual boundary; and
in dependence upon detecting movement of the moving object from the first portion of the monitored scene space to the second portion of the monitored scene space across the at least one virtual boundary, change the target direction from a first direction being one of one or more target directions associated with the first portion of the monitored scene space to a second direction being one of the one or more target directions associated with the second portion of the monitored scene space, wherein the second direction is different from the first direction.

12. The apparatus of claim 11, wherein the combined audio output signal has directional gain enhancing audio produced by the moving object.

13. The apparatus of claim 11, wherein the target direction is determined by the bearing of the moving object and/or wherein the target direction is a bearing of the moving object.

14. The apparatus of claim 11, further caused to:
define a plurality of portions of the monitored scene space demarcated by virtual boundaries;
detect movement of the moving object from an originating portion of the monitored scene space to a destination portion of the monitored scene space across one or more virtual boundaries; and
in dependence upon detecting movement of the moving object from an originating portion of the monitored scene space to a destination portion of the monitored scene space across one or more virtual boundaries, change the target direction to point towards a predetermined bearing within the originating portion of the monitored scene space to a predetermined bearing within the destination portion of the monitored scene space.

15. The apparatus of claim 11, further caused to provide for user predefinition of one or more virtual boundaries and/or user predefinition of one or more target directions.

16. The apparatus of claim 11, wherein filtering outputs from a plurality of spatially diverse microphones in dependence upon the bearing of the moving object in the monitored scene space to produce a combined audio output signal comprises using a filter-sum beamformer or delay-sum beamformer configured in dependence upon the bearing of the moving object in the monitored scene space.

17. The apparatus of claim 11, further caused to:
determine whether the filtering of outputs from the plurality of spatially diverse microphones has directional gain configured to enhance audio produced by the moving object or directional gain configured to enhance audio produced other than by the moving object
and/or
determine whether the filtering of outputs from the plurality of spatially diverse microphones has directional gain configured to enhance audio produced by the moving object or directional gain configured to enhance audio produced by a different object.

18. The apparatus of claim 11, wherein the processing of the received image data and/or the received depth data to track an object moving in a monitored scene space; the determining a bearing of the moving object in the monitored scene space; and the filtering of outputs from the plurality of spatially diverse microphones in dependence upon the bearing of the moving object in the monitored scene space, occur in real-time to produce in real-time the combined audio output signal.

19. The apparatus of claim 11, further caused to:
process received data to generate a response event when there is, relative to at least one virtual boundary, a change in a portion of the monitored scene space; and
in response to the response event, change the filtering of outputs from the plurality of spatially diverse microphones to produce a combined audio output signal.

20. At least one non-transitory computer readable medium comprising instructions that, when executed, perform:
process received image data and/or received depth data to track an object moving in a monitored scene space;
determine a bearing of the moving object in the monitored scene space;
filter outputs from a plurality of spatially diverse microphones in dependence upon the bearing of the moving object in the monitored scene space to produce a combined audio output signal, wherein the combined audio output signal has directional gain in a target direction;
define at least a first portion of the monitored scene space and a second portion of the monitored scene space separated by at least one virtual boundary;
detect movement of the moving object from the first portion of the monitored scene space to the second portion of the monitored scene space across the at least one virtual boundary; and
in dependence upon detecting movement of the moving object from the first portion of the monitored scene space to the second portion of the monitored scene space across the at least one virtual boundary, change the target direction from a first direction being one of one or more target directions associated with the first portion of the monitored scene space to a second direction being one of the one or more target directions associated with the second portion of the monitored scene space, wherein the second direction is different from the first direction.

* * * * *